June 15, 1948. T. K. ANDERSEN 2,443,175
MATERIAL HANDLING APPARATUS
Filed April 4, 1946 2 Sheets-Sheet 1

INVENTOR.
Thomas K. Andersen
BY
ATTORNEY

June 15, 1948. T. K. ANDERSEN 2,443,175
MATERIAL HANDLING APPARATUS
Filed April 4, 1946 2 Sheets-Sheet 2
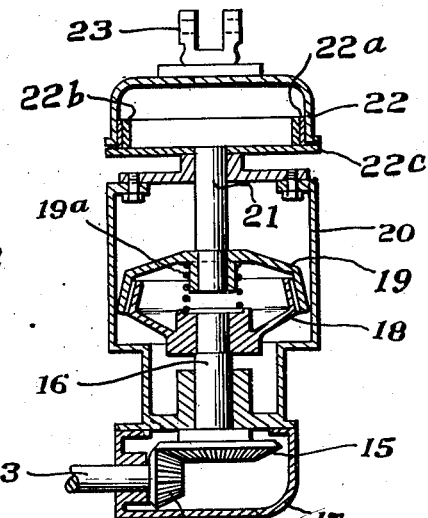
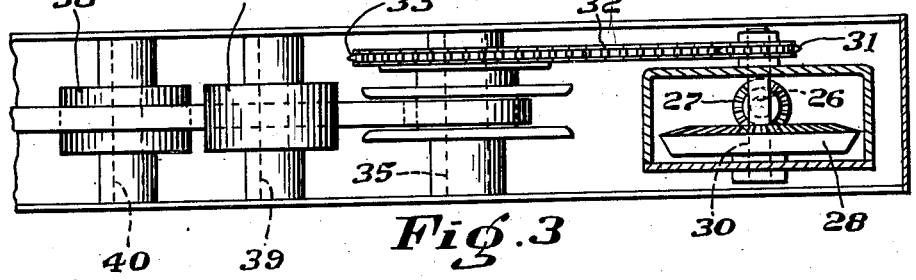
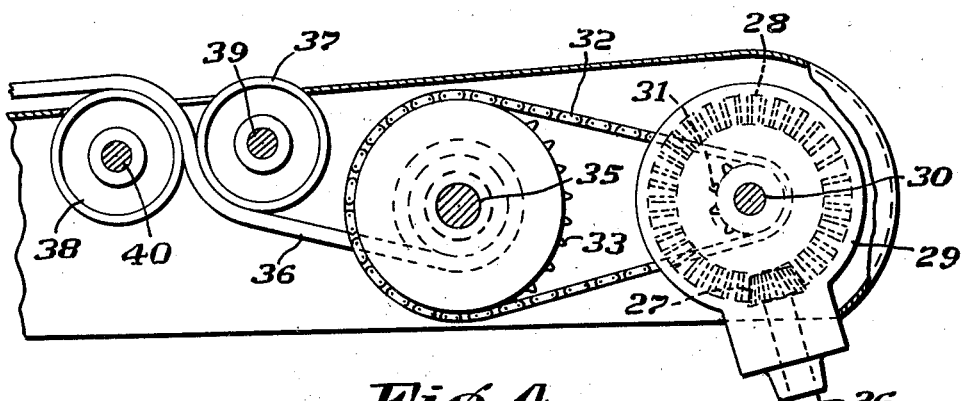
INVENTOR.
*Thomas K. Andersen*
BY
*Geo. B. Rawlings.*
ATTORNEY Patented June 15, 1948

2,443,175

UNITED STATES PATENT OFFICE 2,443,175

MATERIAL HANDLING APPARATUS

Thomas K. Andersen, Staten Island, N. Y.

Application April 4, 1946, Serial No. 659,515

3 Claims. (Cl. 214—131)

My present invention relates to material handling equipment, such as power shovels or other loaders, and while not restricted thereto is particularly designed for use with the power shovel disclosed in the Andersen Patent No. 2,182,781, dated December 12, 1939.

The main object of my invention is to provide an improved power driven assembly including speed reduction, clutch, and brake for the hoist drum of a power shovel or other loader, by means of which the bucket or other receptacle may be positively and reliably driven and controlled at all times in its movements from loading to dumping position, and vice versa.

Other objects and advantages, together with the novel features of the construction and arrangement of parts constituting the device will appear as the description of the invention progresses.

In the accompanying drawings illustrating my invention and so much of the supporting and carrying vehicle therefor as is necessary.

Figure 2 is a sectional side elevation of the clutch casing and clutch parts contained therein, Figure 3 is a plan view of the platform mounted on the roof of the tractor or other vehicle and illustrating the controlling mechanism; and Figure 4 is a side elevation of the mechanism shown in Fig. 3.

Figure 1:
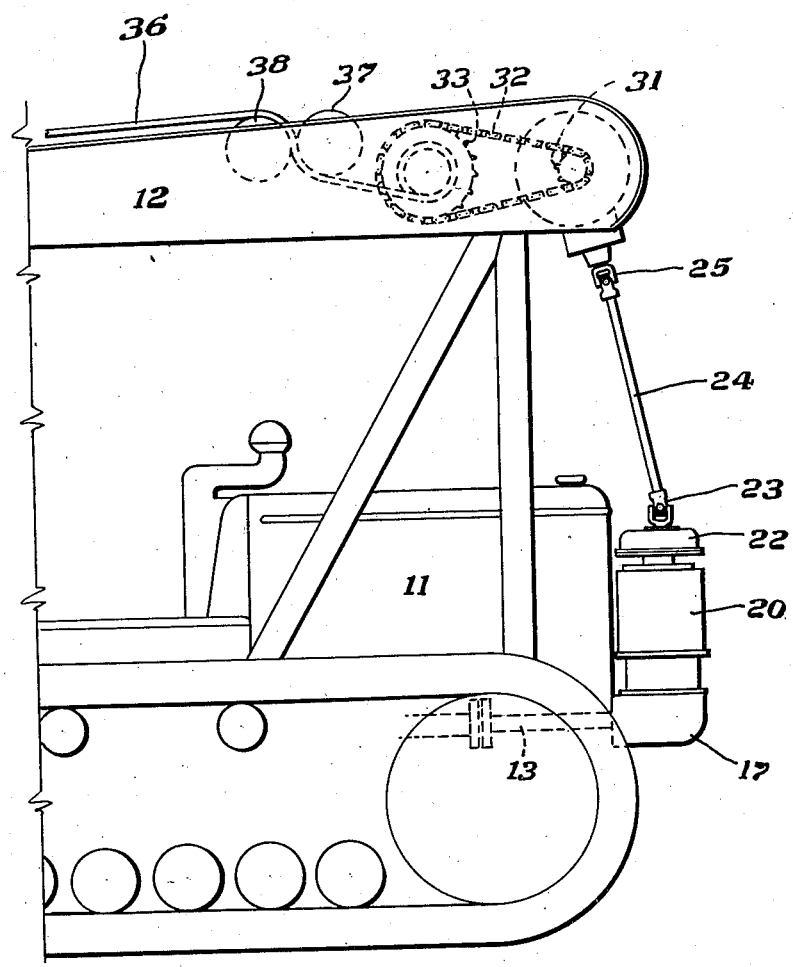
Figure 1 is a side elevation of a power shovel equipped with my invention.

Referring to the drawings I have designated generally at 10 a tractor or other suitable vehicle on which my invention is mounted, said vehicle being provided with the usual power plant beneath a hood 11. Above the framework of the tractor and supported on suitable uprights is a platform or roof 12 carrying the control mechanism of the present invention.

At the front of the hood 11, adjacent the lower portion thereof, is a power-take-off shaft 13 which is conventionally coupled with the power plant. Shaft 13 has a first reduction unit comprising a bevel pinion 14 secured to its outer end, meshing with and driving a bevel gear 15 attached to a vertical stub shaft 16 mounted for rotation in a gear box 17 in which pinion 14 and gear 15 are housed. The upper end of stub shaft 16 (see Fig. 2) is connected in any conventional manner, to the driving member 18 of a clutch, the driven member of which is indicated at 19. When the clutch is thrown out or disengaged, members 18 and 19 are held out of driving engagement by a coil spring 19a. Clutch shaft 21 is connected at its lower end to the driven member 19, and extends upwardly and has mounted on its upper end a universal joint 23. Clutch members 18 and 19 and the lower end of clutch shaft 21 are enclosed in a clutch casing 20. Secured to the lower part of the universal joint 23 is a rotatable brake drum 22, which may be any standard automobile internal brake drum, and having a cooperating lining 22a riveted in the usual manner to the brake shoes 22b, which are conventionally attached to the backing plate 22c, which is in turn bolted to the clutch casing 20.

The upper part of the universal joint 23, is secured (see Fig. 1) to the lower end of an upwardly extending shaft 24, the upper end of such shaft being connected, by universal joint 25, to the lower end of a vertical stub shaft 26. Stub shaft 26 is rotatably mounted in a suitable bearing in the platform or roof 12 and has a second reduction unit comprising a bevel pinion 27 meshing with and driving a bevel gear 28 located within a gear box 29 on the platform or roof 12. Bevel gear 28 is fast on a horizontal sprocket shaft 30 mounted for rotation in suitable bearings in the platform or roof 12.

Fast on shaft 30 and spaced from bevel gear 28 is a sprocket 31 which is aligned with a sprocket 33 secured directly to a hoisting drum 34 fast on a drum shaft 35 rotatable in suitable journals on the platform or roof 12.

Running over sprockets 31 and 33 is an endless sprocket chain 32 constituting a third reduction unit by means of which power is transmitted from shaft 30 to drum shaft 35.

Secured to the hoisting drum 34 is one end of a hoisting chain or cable 36 which is adapted to be wound up on, or payed off from, the drum 34. Connection 36 passes upwardly from drum 34 between two idler sheaves 37 and 38 mounted respectively on shafts 39 and 40 in the platform or roof 12, and is attached at its free end to the bucket carrying arms, boom, or similar carrying structure for a material holding device, bucket or receptacle (not shown). As connection 36 is wound on the drum 34, it is in engagement with the idler sheave 38 until such time as the bucket passes a point vertically above the space between the idler sheaves 37 and 38. When this point is reached, hoisting connection 36 leaves idler sheave 38 and moves into engagement with idler sheave 37 and remains in engagement with such sheave until the load is dumped and the bucket brought upwardly again to the vertical position, whereupon said connection 36 returns to its engagement with the idler sheave 38.

Suitable means (not shown) for controlling the clutch and brake are arranged within convenient reach of the tractor operator.

The operation is as follows:

With the tractor motor running, driving member 18 of the clutch is in rotation through power take off shaft 13, reduction gears 14 and 15 and stub shaft 16. When the clutch is engaged, clutch shaft 21 will be rotated and through universal joint 23 will rotate brake drum 22, as well as hoisting drum 34 through the intermediary of the connection 24, 25, 26, reduction gears 27 and 28, and sprocket shaft 30, and sprockets 31 and 33 and chain 32, and thus raise or lower the hoisting connection 36.

The movement of the bucket from loading to dumping position, or vice versa, may be arrested at any point by throwing out the clutch and applying the brake.

From the foregoing description, taken in connection with the accompanying drawing, it will be evident that I have provided a simple and reliable power drive for actuating and controlling a hoisting unit.

It will be noted that the reduction gears 14 and 15 and 27 and 28 and sprockets 31 and 33 respectively provide three distinct and independent reductions by means of which the high speed of the tractor motor (usually around 1400 R. P. M.) may be reduced to approximately 40 R. P. M. at the hoist drum. It is essential that the hoist drum rotate slowly, as compared with the speed of the tractor motor, in order that the available horsepower of the motor for lifting the loaded bucket may be utilized without stalling the motor and better control of the bucket be also secured.

If desired, the assembly may be provided with an automatic knock-out of known construction whereby, when the bucket passes dead center going toward either its loading or its dumping position, the clutch will be automatically disengaged, after which the operator may manually release the brake to allow the bucket to descend under control.

Likewise, if desired, the assembly may be provided with mechanism such as that shown in the application of Carle Henry, Serial No. 659,464, filed April 4, 1946, for releasing the brake without engaging the clutch, or for releasing the brake when engaging the clutch.

It will be further noted that the vertical shaft 24 is rotating faster than the hoist drum shaft 35. By mounting the brake unit on vertical shaft 24 instead of on hoist drum shaft 35, as in my companion application Serial No. 659,514, filed April 4, 1946, I am enabled to use a smaller brake than is the case where the brake and hoist drums are mounted on the same shaft.

The term "bucket" as used herein is used in its broadest sense to mean any digging and/or loading implement, as a dirt bucket, snow bucket, back hoe, lifting fork, or the like, and the term "bucket arms" as used herein is likewise used in its broadest sense to mean any structure, whether a pair of arms, or a yoke, or a broom disposed in the fore and aft line of the vehicle, by means of which the bucket is pivotally supported on the tractor or other vehicle for swinging movements in an arcuate path over the vehicle.

While I have disclosed a preferred embodiment of my invention, I recognize that the same may be variously modified to suit special installations, and accordingly assert all such modifications, to be within the purview of my invention as defined in the appended claims.

I claim:

1. In combination with a vehicle having a roof and a motor, a bucket pivoted to said vehicle to swing vertically relative thereto, a power drive assembly for driving and controlling said bucket comprising a power-take-off shaft to be coupled to the vehicle motor, a driving shaft arranged vertically at the front end of the vehicle, a speed reduction unit between and connecting said take-off shaft to said vertical shaft, a cross shaft on the vehicle roof, a speed reduction unit between and connecting said vertical shaft to said cross shaft, a clutch comprising a clutch shaft connected to said vertical shaft, a driven part on said clutch shaft, and a driving part to be rotated from the take-off shaft, a brake drum fast on said clutch shaft to rotate therewith, a drum shaft on the vehicle roof and spaced from said cross shaft, driving connections between said drum and cross shafts, a hoist drum on said drum shaft, and a connection from said drum to said bucket.

2. In combination with a vehicle having a roof and a motor, a bucket pivoted to said vehicle to swing vertically relative thereto, a power drive assembly for driving and controlling said bucket comprising a power take-off shaft to be coupled to the vehicle motor, a first vertical stub shaft at the front end of the vehicle and driven from said take-off shaft, a clutch comprising a clutch shaft, a driven part on said clutch shaft and a driving part on said first stub shaft, a brake drum fast on said clutch shaft to rotate therewith, a vertical driving shaft having a universal joint connection at its lower end with said clutch shaft, a second vertical stub shaft having a universal joint connection with the upper end of said vertical driving shaft, a cross shaft on the vehicle roof and driven from said second stub shaft, a drum shaft on the vehicle roof and spaced from said cross shaft, a hoist drum on said drum shaft, and a connection from said drum to said bucket.

3. The combination of claim 2 wherein the driving connections between the first stub shaft and the take-off shaft and between the second stub shaft and the cross shaft each includes speed-reduction gearing.

THOMAS K. ANDERSEN.

REFERENCES CITED

The following references are of record in the file of this patent:

UNITED STATES PATENTS

| Number | Name | Date |
|---|---|---|
| 1,506,762 | Manierre | Sept. 2, 1924 |
| 1,805,028 | Anthony et al. | May 12, 1931 |
| 1,890,975 | Erdahl | Dec. 13, 1932 |
| 2,330,802 | Andersen et al. | Oct. 5, 1943 |